United States Patent
Prasad Challa et al.

(10) Patent No.: US 12,043,309 B2
(45) Date of Patent: Jul. 23, 2024

(54) VEHICULAR CONTROL SYSTEM WITH ENHANCED LANE CENTERING

(71) Applicant: Magna Electronics Inc., Auburn Hills, MI (US)

(72) Inventors: Venkata Satya Siva Prasad Challa, Troy, MI (US); Tejas Murlidhar Varunjikar, Troy, MI (US); Arpit Awathe, Auburn Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 148 days.

(21) Appl. No.: 17/445,199

(22) Filed: Aug. 17, 2021

(65) Prior Publication Data
US 2022/0048566 A1    Feb. 17, 2022

Related U.S. Application Data

(60) Provisional application No. 62/706,438, filed on Aug. 17, 2020.

(51) Int. Cl.
*B60W 30/00*    (2006.01)
*B60W 30/09*    (2012.01)
(Continued)

(52) U.S. Cl.
CPC ........... *B62D 15/025* (2013.01); *B60W 30/09* (2013.01); *B60W 30/0953* (2013.01);
(Continued)

(58) Field of Classification Search
CPC ............... B62D 15/025; G06T 7/70; G06T 2207/30256; G06F 18/25
(Continued)

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

FOREIGN PATENT DOCUMENTS

EP    3360746 A1 *    8/2018    ............ B60W 30/12

OTHER PUBLICATIONS

Snider J.M., "Automatic Steering Methods for Autonomous Automobile Path Tracking", Feb. 2009, CMU thesis.
(Continued)

*Primary Examiner* — Tiffany P Young
(74) *Attorney, Agent, or Firm* — HONIGMAN LLP

(57) ABSTRACT

A vehicular control system includes a camera that captures image data. The system includes an electronic control unit (ECU) for processing image data captured by the camera. The ECU, via processing by an image processor of image data captured by the camera, determines lane information of a traffic lane along a road being traveled by the equipped vehicle. The ECU determines a lane quality value that represents a confidence in the determined lane information. When the lane quality value exceeds a threshold value, and based at least in part on the determined lane information, the ECU provides a steering command to a steering system of the equipped vehicle to adjust a heading of the equipped vehicle to center the equipped vehicle within the traffic lane of the road being traveled by the equipped vehicle.

20 Claims, 2 Drawing Sheets

(51) Int. Cl.
*B60W 30/095* (2012.01)
*B60W 30/10* (2006.01)
*B60W 30/18* (2012.01)
*B60W 40/04* (2006.01)
*B60W 50/029* (2012.01)
*B60W 50/14* (2020.01)
*B62D 15/02* (2006.01)
*G06F 18/25* (2023.01)
*G06T 7/70* (2017.01)
*G06V 20/58* (2022.01)

(52) U.S. Cl.
CPC ...... *B60W 30/10* (2013.01); *B60W 30/18018* (2013.01); *B60W 30/18159* (2020.02); *B60W 40/04* (2013.01); *B60W 50/029* (2013.01); *B60W 50/14* (2013.01); *G06F 18/25* (2023.01); *G06T 7/70* (2017.01); *G06V 20/584* (2022.01); *B60W 2050/0292* (2013.01); *B60W 2050/146* (2013.01); *B60W 2420/403* (2013.01); *B60W 2420/408* (2024.01); *B60W 2552/53* (2020.02); *B60W 2554/402* (2020.02); *B60W 2554/404* (2020.02); *B60W 2554/4041* (2020.02); *B60W 2554/80* (2020.02); *G06T 2207/30236* (2013.01); *G06T 2207/30256* (2013.01)

(58) Field of Classification Search
USPC .......................................................... 701/41
See application file for complete search history.

(56) References Cited

U.S. PATENT DOCUMENTS

| | | | |
|---|---|---|---|
| 5,949,331 A | 9/1999 | Schofield et al. | |
| 6,580,986 B1 * | 6/2003 | Uenuma | G05D 1/0246 701/28 |
| 6,690,268 B2 | 2/2004 | Schofield et al. | |
| 6,824,281 B2 | 11/2004 | Schofield et al. | |
| 7,038,577 B2 | 5/2006 | Pawlicki et al. | |
| 7,480,149 B2 | 1/2009 | DeWard et al. | |
| 7,720,580 B2 | 5/2010 | Higgins-Luthman | |
| 7,855,755 B2 | 12/2010 | Weller et al. | |
| 8,256,821 B2 | 9/2012 | Lawlor et al. | |
| 9,180,908 B2 | 11/2015 | Van Dan Elzen et al. | |
| 9,487,159 B2 | 11/2016 | Achenbach | |
| 9,596,387 B2 | 3/2017 | Achenbach et al. | |
| 9,871,971 B2 | 1/2018 | Wang et al. | |
| 9,896,039 B2 | 2/2018 | Achenbach et al. | |
| 9,988,047 B2 | 6/2018 | Johnson et al. | |
| 10,032,369 B2 | 7/2018 | Koravadi | |
| 10,055,651 B2 | 8/2018 | Chundrlik, Jr. et al. | |
| 10,071,687 B2 | 9/2018 | Ihlenburg et al. | |
| 10,099,614 B2 | 10/2018 | Diessner | |
| 10,268,904 B2 | 4/2019 | Gupta | |
| 10,315,651 B2 | 6/2019 | Fiaschetti et al. | |
| 10,449,899 B2 | 10/2019 | Gupta et al. | |
| 2009/0295181 A1 | 12/2009 | Lawlor et al. | |
| 2011/0010054 A1 * | 1/2011 | Wilson-Jones | B62D 6/00 701/41 |
| 2014/0160284 A1 | 6/2014 | Achenbach et al. | |
| 2014/0226012 A1 | 8/2014 | Achenbach | |
| 2015/0015713 A1 | 1/2015 | Wang et al. | |
| 2015/0327398 A1 | 11/2015 | Achenbach et al. | |
| 2016/0159394 A1 * | 6/2016 | Ryu | B62D 5/0493 701/41 |
| 2022/0048504 A1 | 2/2022 | Prasad Challa et al. | |
| 2022/0048509 A1 | 2/2022 | Prasad Challa | |

OTHER PUBLICATIONS

Werling et al., Invariant Trajectory Tracking With a Full-Size Autonomous Road Vehicle, IEEE, vol. 26, No. 4, Aug. 2010.
Werling et al., Optimal trajectories for time-critical street scenarios using discretized terminal manifolds, The International Journal of Robotics Research, Mar. 2012.

* cited by examiner

VEHICULAR CONTROL SYSTEM WITH ENHANCED LANE CENTERING

CROSS REFERENCE TO RELATED APPLICATION

The present application claims the filing benefits of U.S. provisional application Ser. No. 62/706,438, filed Aug. 17, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vehicular control system that includes a camera disposed at a vehicle equipped with the vehicular control system and viewing forward of the vehicle. The camera captures image data. The system includes an electronic control unit (ECU) with electronic circuitry and associated software. The electronic circuitry of the ECU includes an image processor for processing image data captured by the camera. The ECU, via processing by the image processor of image data captured by the camera, determines lane information of a traffic lane along a road being traveled by the equipped vehicle. The ECU determines a lane quality value that represents a confidence in the determined lane information. When the lane quality value exceeds a threshold value, and based at least in part on the determined lane information, the ECU provides a steering command to a steering system of the equipped vehicle to adjust a heading of the equipped vehicle to center the equipped vehicle within the traffic lane of the road being traveled by the equipped vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to detect lane information such as lane markers and to detect objects in the field of sensing of the sensors. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
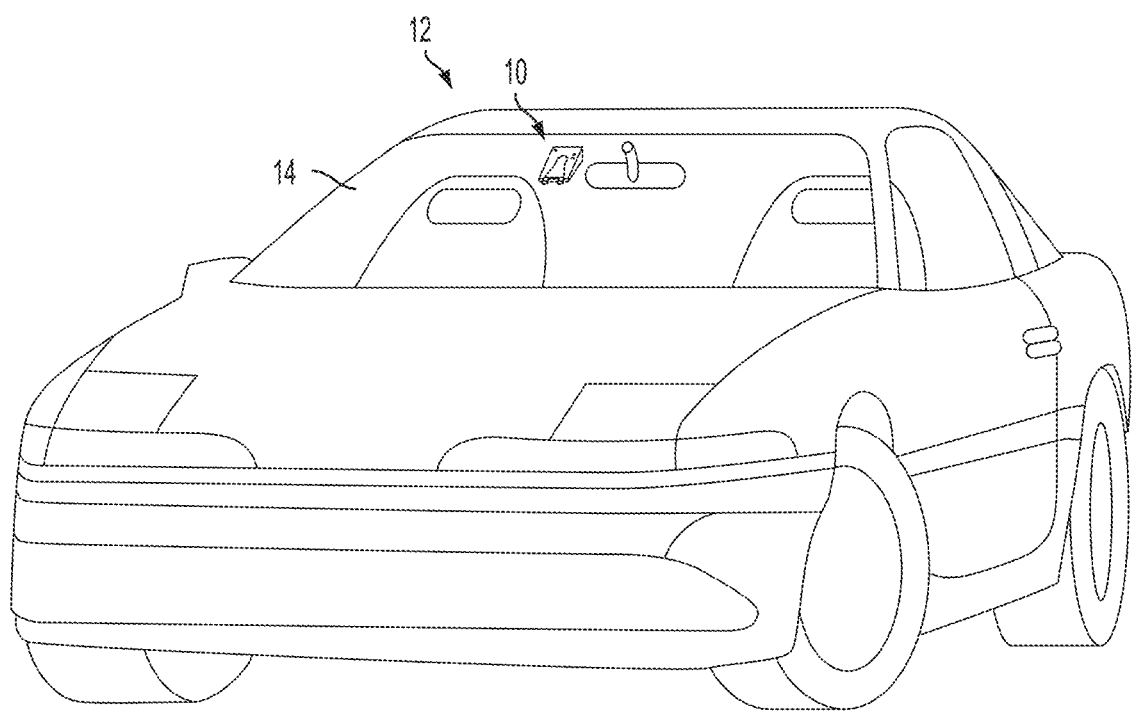
FIG. 1 is a perspective view of a vehicle with a vision system that incorporates a camera.

Referring now to the drawings and the illustrative embodiments depicted therein, a vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. The forward viewing camera disposed at the windshield of the vehicle views through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) having electronic circuitry and associated software, with the electronic circuitry including a data processor or image processor that is operable to process image data captured by the camera or cameras, whereby the ECU may detect or determine presence of objects or the like and/or the system provide displayed images at a display device for viewing by the driver of the vehicle. The data transfer or signal communication from the camera to the ECU may comprise any suitable data or communication link, such as a vehicle network bus or the like of the equipped vehicle. The system may utilize aspects of U.S. patent application Ser. No. 17/445,198, filed Aug. 17, 2021 for VEHICULAR CONTROL SYSTEM WITH TRAFFIC JAM ASSIST, which published on Feb. 17, 2022 as U.S. Patent Publication No. US-2022-0048509, and/or Ser. No. 17/445,200 filed Aug. 17, 2021 for VEHICULAR CONTROL SYSTEM WITH AUTONOMOUS BRAKING, now U.S. Pat. No. 11,964,691, which are hereby incorporated herein by reference in their entireties.

The forward viewing or front-looking camera (FLC) is an integral part of Advanced Driver Assistance Systems (ADAS) deployed in passenger vehicles today. The FLC provides a lot of information about the environment in front of vehicle. Object and lane information from the FLC is commonly used for longitudinal and lateral control of vehicles in systems such as adaptive cruise control, lane-keeping assist, lane centering, etc. Implementations herein include a system that enables lateral control of a vehicle equipped with one or more cameras for a lane-centering feature or function. The lane-centering feature assists the driver of a vehicle to keep vehicle centered in the lane the vehicle is travelling along.

Figure 2:
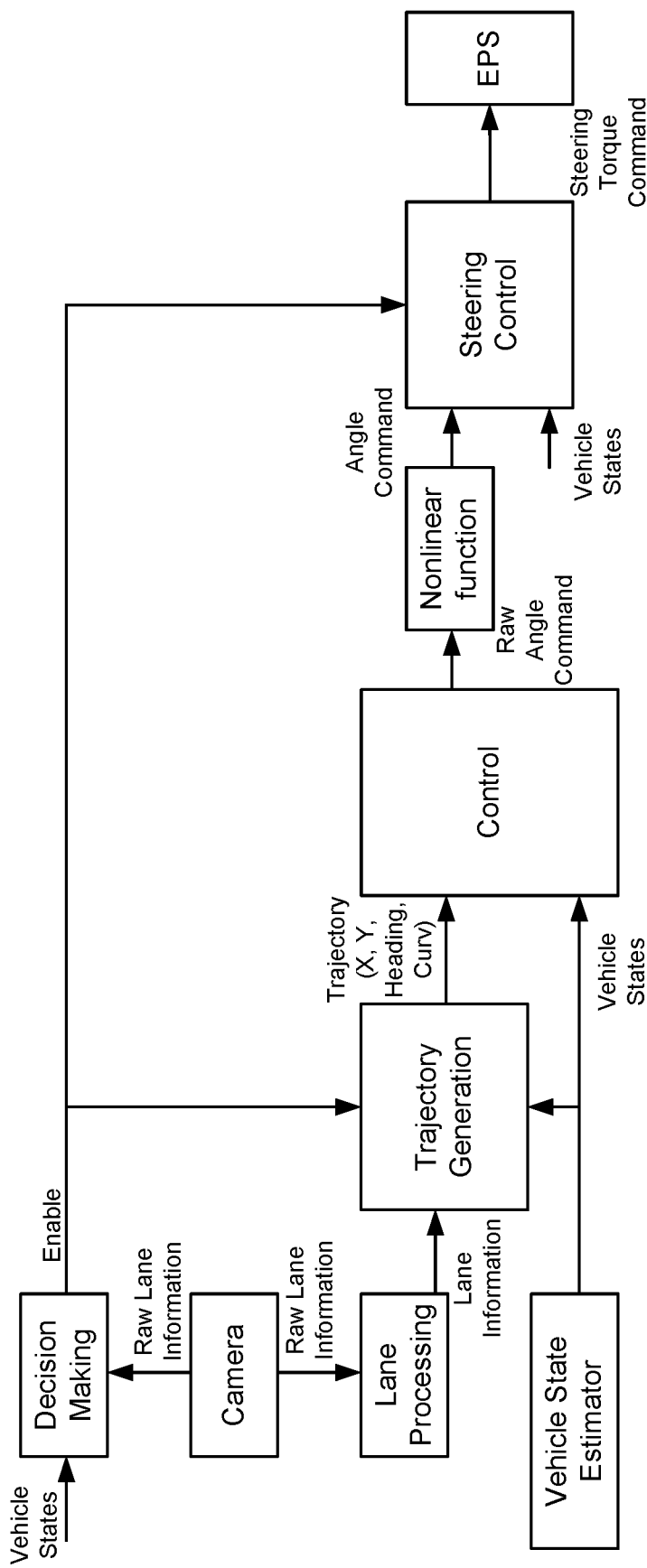
FIG. 2 is a block diagram showing elements of the lane centering system.

As shown in FIG. 2, the system includes a forward viewing camera that captures image data. The camera includes hardware and software that captures and transmits raw lane information such as lane coefficients, quality, lane markers, etc. A vehicle state estimator may include vehicle control modules/algorithms that provide vehicle state information such as vehicle speed, yaw rate, etc. A trajectory generation module may calculate or determine a path or trajectory for the equipped vehicle to follow. Using a desired or determined vehicle trajectory and current vehicle states, the control module may generate a steer command for the vehicle, that, when executed, will cause the vehicle to follow the desired or determined trajectory. Alternatively, instead of a steering angle, the system may determine a steering angle or curvature as well.

A decision-making module uses vehicle states (e.g., from one or more other modules or sensors such as wheel speed sensors, accelerometers, steering wheel angle sensors, etc.) and raw lane image data or information (i.e., from the camera) to determine whether to enable or disable the feature. A lane processing module processes raw lane information (i.e., derived from image data captured by the camera) to generate processed lane information that allows smoother trajectory generation.

A nonlinear function module modifies a raw angle command generated by a control to produce a new angle command. A steering control converts the steer angle command to a steering torque command, and the electric power steering (EPS) system or module or other steering system (i.e., hardware and software) applies the steering torque command to enable the ADAS feature for lateral control.

Thus, the Lane Centering ADAS system generates a steering torque command based on captured image data (i.e., captured by the camera) and from information derived from the image data. The system includes a decision-making module that determines and enable and/or disable signal for the system. Optionally, the decision-making module determines (using lane information derived from captured image data) whether a single lane or dual lane quality value exceeds a threshold. The lane quality value represents a confidence of the lane marker detection based on image processing. That is, a higher quality value corresponds to a higher confidence is lane marker detection. For example, faded lane markers may have a lower quality value than lane markers that have been freshly painted. The lane quality value may be a continuous value (e.g., any value between 0 and 1) or a set of discrete values (e.g., 0, 1, 2, 3, etc.).

When the quality value exceeds a threshold (i.e., the decision-making module has a predetermined degree of confidence in the size and/or positioning of the traffic lane), the decision-making module may set an enable signal to TRUE. That is, the decision-making module may enable the system (i.e., the lane centering functionality) when the decision-making module determines a quality of the lane(s) exceeds a threshold value. When the quality does not exceed the threshold value, the decision-making module may disable the system or function. The lane-processing module may modify the lane information such as a lane coefficient. Optionally, the lane-processing module may limit rate of change in lane width value by calculating or determining a secondary lane width. That is, the lane width of the lane (measured based on the determined lane markers) may suddenly change due to various factors such as one lane marker vanishing or becoming faded. Instead of instantaneously reducing the lane width, the system may apply a rate limiter to gradually reduce the lane width. The rate limiter may limit the first derivative of a signal and thus the output cannot change faster than specified limits. The rate limiter helps avoid sudden jumps in the secondary lane width and helps ensure smooth performance for lane centering. Optionally, the lane-processing module selects a lane marker with a lower curvature coefficient value and calculates or determines a virtual lane marker using the selected lane marker and the secondary lane width.

The nonlinear function may use a nonlinear table to scale down raw angle commands closer to a zero value. The steering control may use at least a feedforward or proportional control to calculate steering torque command. The steering control, for example, holds the last value of the last received torque command when the enable value goes to FALSE. The steering control may gradually reduce the torque command value to zero in a configurable amount of time after the enable value goes to FALSE.

Thus, implementations herein provide a lane centering control system that controls the vehicle to maintain the vehicle within a determined lane, such as when the lane width changes as the equipped vehicle travels along the road. The system includes one or more cameras that capture image data that is processed by the lane centering control system. Optionally, the camera(s) are included within a module (such as a front camera module (FCM)) that includes an image processor and ADAS feature software supporting the functionality describing above. That is, in some examples, a camera ECU locally processes the captured image data to perform lane centering functions. In other examples, the camera module includes an image processor that processes the image data and a separate ECU or processor that executes the ADAS feature software. In yet other examples, the camera module includes an image processor that processes the image data and the ADAS feature software is executed by an ECU or processor of the vehicle that is remote from the camera module.

For autonomous vehicles suitable for deployment with the systems described herein, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:
- a camera disposed at a vehicle equipped with the vehicular control system and viewing forward of the equipped vehicle, the camera capturing image data;
- an electronic control unit (ECU) comprising electronic circuitry and associated software;
- wherein the electronic circuitry of the ECU comprises an image processor for processing image data captured by the camera;
- wherein the ECU, via processing by the image processor of image data captured by the camera, determines lane information of a traffic lane along a road being traveled by the equipped vehicle;
- wherein the determined lane information comprises (i) lane width information of the traffic lane and (ii) a rate of change of lane width of the traffic lane;
- wherein the vehicular control system determines lane width of the traffic lane based on the determined lane information;
- wherein the vehicular control system, as the vehicle travels along the road, limits change of the determined lane width based at least in part on the rate of change of lane width of the traffic lane;
- wherein the ECU determines a lane quality value that represents a confidence in the determined lane width;
- wherein, when the lane quality value exceeds a threshold value, and based at least in part on the determined lane width, the vehicular control system provides a steering command to a steering system of the equipped vehicle to adjust a heading of the equipped vehicle to center the equipped vehicle within the traffic lane of the road being traveled by the equipped vehicle; and
- wherein, responsive to the determined lane quality value being below the threshold value, the vehicular control system disables generation of steering commands.

2. The vehicular control system of claim 1, wherein the vehicular control system limits a derivative of the determined lane width from exceeding a specified limit.

3. The vehicular control system of claim 1, wherein the vehicular control system limits the change in the determined lane width by determining a secondary lane width of the traffic lane in which the equipped vehicle is traveling.

4. The vehicular control system of claim 3, wherein the ECU determines the lane information at least in part by determining one or more lane markers of the traffic lane of the road, and wherein the vehicular control system estimates a virtual lane marker using a selected lane marker of the one or more determined lane markers and the determined secondary lane width.

5. The vehicular control system of claim 1, wherein the ECU determines the lane information at least in part by determining one or more lane markers of the traffic lane of the road.

6. The vehicular control system of claim 1, wherein the ECU generates a raw steering angle command, and wherein the ECU, using a nonlinear function, generates the steering command based on the raw steering angle command.

7. The vehicular control system of claim 6, wherein the nonlinear function scales the raw steering angle command from an initial value to a final value, wherein the final value is smaller than the initial value.

8. The vehicular control system of claim 1, wherein the ECU generates the steering command using at least one selected from the group consisting of (i) a feedforward control signal and (ii) a proportional control signal.

9. The vehicular control system of claim 1, wherein the vehicular control system, responsive to the determined lane quality value being below the threshold value after the vehicular control system provides the steering command to the steering system of the equipped vehicle, provides a second steering command to the steering system of the equipped vehicle, and wherein the second steering command is operable to adjust the heading of the equipped vehicle to a lesser degree than the steering command.

10. The vehicular control system of claim 1, wherein the vehicular control system, responsive to the determined lane quality value being below the threshold value after the vehicular control system provides the steering command to the steering system of the equipped vehicle, provides a second steering command to the steering system of the equipped vehicle, and wherein the second steering command is operable to adjust the heading of the equipped vehicle to the same degree as the steering command.

11. The vehicular control system of claim 1, wherein the ECU, based on the determined lane information, generates a trajectory for the equipped vehicle to follow along the road being traveled by the equipped vehicle.

12. A vehicular control system, the vehicular control system comprising:
- a camera disposed at a vehicle equipped with the vehicular control system and viewing forward of the equipped vehicle, the camera capturing image data;
- an electronic control unit (ECU) comprising electronic circuitry and associated software;
- wherein the electronic circuitry of the ECU comprises an image processor for processing image data captured by the camera;
- wherein the ECU, via processing by the image processor of image data captured by the camera, determines lane information of a traffic lane along a road being traveled by the equipped vehicle
- wherein the determined lane information comprises (i) lane width information of the traffic lane and (ii) a rate of change of lane width of the traffic lane;
- wherein the vehicular control system determines lane width of the traffic lane based on the determined lane information;
- wherein the vehicular control system, as the vehicle travels along the road, limits change of the determined lane width based at least in part on the rate of change of lane width of the traffic lane;
- wherein the ECU determines a lane quality value that represents a confidence in the determined lane width;
- wherein, when the lane quality value exceeds a threshold value, and based at least in part on the determined lane, the vehicular control system provides a steering command to a steering system of the equipped vehicle to adjust a heading of the equipped vehicle within the traffic lane of the road being traveled by the equipped vehicle;
- wherein the ECU generates a raw steering angle command, and wherein the ECU, using a nonlinear function, generates the steering command based on the raw steering angle command; and
- wherein, responsive to the determined lane quality value being below the threshold value, the vehicular control system disables generation of steering commands.

13. The vehicular control system of claim 12, wherein the vehicular control system limits a derivative of the determined lane width from exceeding a specified limit.

14. The vehicular control system of claim 12, wherein the vehicular control system limits the change in the determined lane width by determining a secondary lane width of the traffic lane in which the equipped vehicle is traveling.

15. The vehicular control system of claim 14, wherein the ECU determines the lane information at least in part by determining one or more lane markers of the traffic lane of the road, and wherein the vehicular control system estimates a virtual lane marker using a selected lane marker of the one or more determined lane markers and the determined secondary lane width.

16. The vehicular control system of claim 12, wherein the ECU determines the lane information at least in part by determining one or more lane markers of the traffic lane of the road.

17. The vehicular control system of claim 12, wherein the nonlinear function scales the raw steering angle command from an initial value to a final value, wherein the final value is smaller than the initial value.

18. A vehicular control system, the vehicular control system comprising:
- a camera disposed at a vehicle equipped with the vehicular control system and viewing forward of the equipped vehicle, the camera capturing image data;
- an electronic control unit (ECU) comprising electronic circuitry and associated software;
- wherein the electronic circuitry of the ECU comprises an image processor for processing image data captured by the camera;
- wherein the ECU, via processing by the image processor of image data captured by the camera, determines lane information of a traffic lane along a road being traveled by the equipped vehicle
- wherein the determined lane information comprises (i) lane width information of the traffic lane and (ii) a rate of lane width of the traffic lane
- wherein the vehicular control system determines lane width of the traffic lane based on the determined lane information;
- wherein the vehicular control system, as the vehicle travels along the road, limits change of the determined lane width based at least in part on the rate of change of lane width of the traffic lane, and wherein the vehicular control system limits a derivative of the determined lane width from exceeding a specified limit;
- wherein the ECU determines a lane quality value that represents a confidence in the determined lane information;
- wherein, when the lane quality value exceeds a threshold value, and based at least in part on the determined lane width, the vehicular control system provides a steering command to a steering system of the equipped vehicle to adjust a heading of the equipped vehicle to center the equipped vehicle within the traffic lane of the road being traveled by the equipped vehicle;
- wherein the ECU generates the steering command using at least one selected from the group consisting of (i) a feedforward control signal and (ii) a proportional control signal; and
- wherein, responsive to the determined lane quality value being below the threshold value, the vehicular control system disables generation of steering commands.

19. The vehicular control system of claim 18, wherein the vehicular control system limits the change in the determined lane width by determining a secondary lane width of the traffic lane in which the equipped vehicle is traveling.

20. The vehicular control system of claim 19, wherein the ECU determines the lane information at least in part by determining one or more lane markers of the traffic lane of the road, and wherein the vehicular control system estimates a virtual lane marker using a selected lane marker of the one or more determined lane markers and the determined secondary lane width.

* * * * *

UNITED STATES PATENT AND TRADEMARK OFFICE
CERTIFICATE OF CORRECTION

| | | |
|---|---|---|
| PATENT NO. | : 12,043,309 B2 | Page 1 of 1 |
| APPLICATION NO. | : 17/445199 | |
| DATED | : July 23, 2024 | |
| INVENTOR(S) | : Venkata Satya Siva Prasad Challa et al. | |

It is certified that error appears in the above-identified patent and that said Letters Patent is hereby corrected as shown below:

In the Claims

Column 9
Claim 18, Lines 33-34, "a rate of lane width" should be --a rate of change of lane width--

Signed and Sealed this
Twenty-first Day of January, 2025

Coke Morgan Stewart
*Acting Director of the United States Patent and Trademark Office*